US012717932B2

(12) United States Patent
Hod et al.

(10) Patent No.: US 12,717,932 B2

(45) **Date of Patent: *Aug. 25, 2026**

(54) DETECTION AND PREVENTION OF MALICIOUS SCRIPT ATTACKS USING BEHAVIORAL ANALYSIS OF RUN-TIME SCRIPT EXECUTION EVENTS

(71) Applicant: Akamai Technologies, Inc., Cambridge, MA (US)

(72) Inventors: Maor Hod, Ramat Gan (IL); Ziv Eli, Tel Aviv (IL)

(73) Assignee: Akamai Technologies, Inc., Cambridge, MA (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/975,003

(22) Filed: Dec. 10, 2024

(65) Prior Publication Data

US 2025/0103732 A1 Mar. 27, 2025

Related U.S. Application Data

(63) Continuation of application No. 16/935,777, filed on Jul. 22, 2020, now Pat. No. 12,164,644.

(Continued)

(51) Int. Cl.

*G06F 21/57* (2013.01)

*G06F 9/455* (2018.01)

(Continued)

(52) U.S. Cl.

CPC ........ *G06F 21/577* (2013.01); *G06F 9/45529* (2013.01); *G06F 16/957* (2019.01);

(Continued)

(58) Field of Classification Search

CPC .... G06F 16/957; G06F 21/554; G06F 21/563; G06F 21/577; G06F 9/45529; G06N 20/00

See application file for complete search history.

(56) References Cited

U.S. PATENT DOCUMENTS

| | | | | |
|---|---|---|---|---|
| 7,519,902 | B1 * | 4/2009 | Kraft | G06F 16/951 715/234 |
| 8,079,086 | B1 * | 12/2011 | Edery | G06F 21/56 713/176 |

(Continued)

OTHER PUBLICATIONS

EP Application No. 20844209.5, Examination Report, Jan. 22, 2025.

*Primary Examiner* — Gary S Gracia

(74) *Attorney, Agent, or Firm* — David H. Judson

(57) ABSTRACT

A technique to detect script-based attacks. In this approach, behavioral analysis is performed against a traceable data structure, preferably in the form of a call flow graph (CFG) that is generated at an instrumented end user client browser. The CFG comprises a set of runtime script execution data points and one or more associated event chains that include the execution data points and their relative ordering. It is generated in a client browser in association with an interaction with a page, and it represents a context-based record of that specific interaction. By collecting similar CFGs from other such interactions with that page, the system identifies execution flow anomalies that represent malicious JavaScript attack(s). These attacks can then be mitigated, e.g., by updating the page or access policy associated with the page such that the attack cannot be successfully executed against other users interacting with the page.

16 Claims, 6 Drawing Sheets

Related U.S. Application Data

(60) Provisional application No. 62/877,380, filed on Jul. 23, 2019.

(51) Int. Cl.
*G06F 16/957* (2019.01)
*G06F 21/55* (2013.01)
*G06F 21/56* (2013.01)
*G06N 20/00* (2019.01)

(52) U.S. Cl.
CPC .......... *G06F 21/554* (2013.01); *G06F 21/563* (2013.01); *G06N 20/00* (2019.01)

(56) References Cited

U.S. PATENT DOCUMENTS 8,214,299 B2* 7/2012 Bishop ................. G06Q 20/341 726/28
8,423,476 B2* 4/2013 Bishop ................. G07F 7/0866 705/72
8,752,183 B1* 6/2014 Heiderich ............. G06F 21/577 726/25
8,826,444 B1* 9/2014 Kalle ................. H04N 21/6175 709/224
8,949,406 B2* 2/2015 Wenig ....................... G06F 9/54 709/224
9,419,852 B1* 8/2016 Heller ..................... H04L 41/28
9,584,543 B2* 2/2017 Kaminsky ........... H04L 63/1408
9,727,728 B2* 8/2017 Avrahami ........... H04L 63/1416
9,742,858 B2* 8/2017 Holland .............. G06F 11/3419
10,447,730 B2* 10/2019 Gupta ................... G06F 21/552
10,600,335 B1* 3/2020 Donovan ................. G09B 5/12
10,834,590 B2* 11/2020 Turgeman ............. G06F 21/316
11,102,225 B2* 8/2021 Esman ................ H04L 63/1425
11,194,914 B2* 12/2021 Yang ....................... G06F 21/54
11,314,862 B2* 4/2022 Sawhney .............. G06F 21/554
2004/0205411 A1* 10/2004 Hong .................... G06F 21/566 714/38.1
2007/0113282 A1* 5/2007 Ross ....................... G06F 21/52 726/25
2008/0092060 A1* 4/2008 Berg ..................... G06F 16/958 707/E17.116
2009/0138937 A1* 5/2009 Erlingsson .......... H04L 63/1416 726/1
2010/0011341 A1* 1/2010 Baierl ................. G06F 11/3636 717/110
2010/0042573 A1* 2/2010 Wenig ....................... G06F 9/54 709/202
2011/0239294 A1* 9/2011 Kim ...................... G06F 21/563 726/22
2012/0113918 A1* 5/2012 Freda .................. H04W 56/002 370/329
2015/0169870 A1* 6/2015 Edery ................... H04L 63/145 726/24
2016/0359875 A1* 12/2016 Kim ...................... G06F 21/566
2017/0024781 A1* 1/2017 Lee .................... G06Q 30/0281
2017/0093893 A1* 3/2017 Davydov ................ G06F 21/51
2017/0169224 A1* 6/2017 Park ...................... G06F 21/566
2017/0316202 A1* 11/2017 Roichman ............. G06F 21/577
2017/0337123 A1* 11/2017 Wang .................. G06F 11/3688
2018/0160309 A1* 6/2018 Turgeman ............... G06F 3/041
2018/0183825 A1* 6/2018 Kurupati ............... G06F 21/566
2018/0198807 A1* 7/2018 Johns ..................... G06N 20/00
2018/0300480 A1* 10/2018 Sawhney .............. G06F 21/563
2018/0316696 A1* 11/2018 Takata .................... G06F 11/34
2018/0324269 A1* 11/2018 Heller ..................... H04L 67/14
2018/0373865 A1* 12/2018 Acar ..................... G06F 21/554
2019/0028560 A1* 1/2019 Holland .............. G06F 11/3006
2019/0132355 A1* 5/2019 Egbert ................ H04L 63/1483
2019/0163905 A1* 5/2019 Woodworth .......... G06F 21/554
2019/0190950 A1* 6/2019 Senecal .................... G06N 3/09
2019/0310930 A1* 10/2019 Joglekar ................... G06F 9/52
2020/0089478 A1* 3/2020 Nelson ...................... G06F 8/34
2020/0356661 A1* 11/2020 Stoletny .............. H04L 63/1466
2021/0026969 A1* 1/2021 Hod .................... G06F 9/45529
2021/0235163 A1* 7/2021 Hirsch ................. H04N 21/812
2023/0085434 A1* 3/2023 Bercovici ........ B29D 11/00548 264/1.36
2023/0156123 A1* 5/2023 Yee ......................... G06F 40/30 379/266.08
2024/0020384 A1* 1/2024 Disney .................. G06F 21/554
2025/0365299 A1* 11/2025 Arora ...................... G06F 40/20

* cited by examiner

DETECTION AND PREVENTION OF MALICIOUS SCRIPT ATTACKS USING BEHAVIORAL ANALYSIS OF RUN-TIME SCRIPT EXECUTION EVENTS

BACKGROUND OF THE INVENTION

This application relates generally to strengthening webpage integrity by detecting and mitigating script-based attacks.

Securing web applications has become incredibly important as the information processed by web applications has become critical to corporations, customers, organizations, and countries. Web applications manage a wide array of information including financial data, medical records, social security numbers, intellectual property, and national security data, and they must handle this information securely while maintaining efficiency and availability.

With heightened scrutiny by governments and media, online businesses are facing severe repercussions from even the smallest data compromise. Online businesses, e-commerce, travel and financial institutions are compromised on a daily basis resulting in lost customers and revenues, degraded trust, compromised users' privacy, damaged brand reputation, and regulatory penalties.

Malicious JavaScript (JS) attacks are considered by security experts to be the greatest and often times the least understood of all risks related to confidentiality, availability, and integrity. These types of attacks typically focus on an application itself and available functionalities, with the environment vulnerabilities providing the means for malicious breach of the application protection mechanisms, typically, to take advantage or gain access to private information or system resources. Information gathered can include PII (Personal Identifiable Information) data, such as social security numbers, dates of birth, and maiden names, which are often used in identity theft. Another popular target for attackers is credit card data, which when left unprotected and unencrypted, can be used to cause significant damage to organizations most valued assets-their customers.

There are several known approaches to detecting and mitigating vulnerabilities of this type including, without limitation, Software Development Life Cycle (SDLC), as well as traditional web-application security solutions, such as Web Application Firewall (WAF), Intrusion Prevention System (IPS), and the like. These approaches provide certain benefits and advantages, but they are not designed to continuously verify supply chain attacks and execution of malicious code.

There remains a need in the art for improved techniques to secure dynamic online business web environments.

SUMMARY OF THE INVENTION

This disclosure provides for a method and system to detect script-based attacks using behavioral analysis of run-time JavaScript execution data. In one embodiment, the system includes both a client-side component, and a server-side back-end processing system. On the client-side, a page view within a user session is actively monitored as the page is requested, loaded and acted upon by the end user, and resulting chains of JavaScript execution data points that occur as a result of these activities are captured and used to create a traceable data structure that is delivered to and analyzed by the back-end. As used herein, a JavaScript execution data point is associated with any command or function executed by the browser JavaScript run-time, together with a dataset of associated execution metadata (e.g., constructor name, accessed property or method, timestamp, caller script (originator), and the like. Preferably, the traceable data structure is implemented in a Call Flow Graph (CFG), which captures all JavaScript method calls (including setters and getters) made by the page and third party resources. Each node of the CFG represents a JavaScript execution data point, and thus the graph represents an exact record of the execution of the application, including the caller-called relationships with the caller function and the called function nodes connected by a unique ID reference. The CFG describes all of the relations between and among events, neighbor nodes, grandparent, parent and sibling nodes, and with respect to both synchronous and asynchronous flows. A particular execution data point in the CFG has an associated set of attributes (the execution metadata), typically represented as a vector. In building the CFG, an event is mapped to its corresponding vector representation, concatenated with (or otherwise associated with) other events in an event chain, and preferably further enriched with one or more relevant attributes that describe the specific event. For processing efficiency, preferably the client-side component also processes this data into a compressed and serialized binary file, which is then securely delivered from the client-side to the server-side for analysis.

On the server-side, the system is configured with several components: a detection and classification engine, a recommendation engine, and a policy engine. The server-side analysis and processing typically occurs externally (out-of-band) with respect to the real-time CFG generation processing carried out by the client-side component. The detection and classification engine runs the received CFG through a series of detection layers. These detection layers comprise one or more of: an AI deep learning model layer, a signature layer, a heuristics layer, and the like, and the detection cloud decides whether to issue an incident (or take some other action) based on the received data. If an incident is raised, the page originator is notified of the incident, and the recommendation engine is configured to choose a recommended course of action. If the recommendation is adopted, the output of the recommendation engine is provided to the policy engine, which then automatically generates one or more policy updates that address the issue raised in the incident. The policy update typically is then bundled within a new instance of the client-side component, and then pushed back to the website (or to a Content Delivery Network (CDN) responsible for delivery of the site) to facilitate go-forward enforcement of the policy update with respect to other end users who later access the page.

The client-side component together with the server-side system together provide a Run-time, Web application-based, Self-Protection (RWASP) solution that provides for efficient and scalable behavioral analysis of run-time JavaScript execution data points. The solution protects online businesses from web supply chain attacks (compromised 3rd -party resources), zero-day attacks, web vulnerabilities, and malware code injections.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF DRAWINGS

For a more complete understanding of the subject matter and the advantages thereof, reference is now made to the following descriptions taken in conjunction with the accompanying drawings, in which.

DETAILED DESCRIPTION OF THE INVENTION

The reader is presumed to have familiarity with JavaScript (JS) and browser-based processing of web pages having scripts. As is well-known, browsers (e.g., Google® Chrome, Apple® Safari, Mozilla Firefox, and many others) operate according to a single-threaded execution model, wherein upon triggering of an event, only that event is carried, and with all other activity blocked until such time as an associated callback occurs. More formally, a change in the state of an object is known as an event. In HTML, there are various events that represent that some activity is performed by the user or by the browser. When JavaScript code is included in HTML, JavaScript reacts over these events and allows the execution. This process of reacting over the events is called event handling, and JavaScript handles the HTML events via event handlers.

As a browser requests, loads and executes a page (sometimes referred to herein as a page view), a complex web of execution activity may occur. Depending on the complexity of the business logic, the execution activity often comprises complex synchronous and asynchronous flows, possibly representing numerous execution sequences. Some of this activity, however, may be malicious behavior. Further, a particular end user's interactions with the page provides context-specific activity. Accordingly, capturing and understanding the actual behavior of the page across myriad users and different interaction contexts represents a significant challenge.

Figure 1:
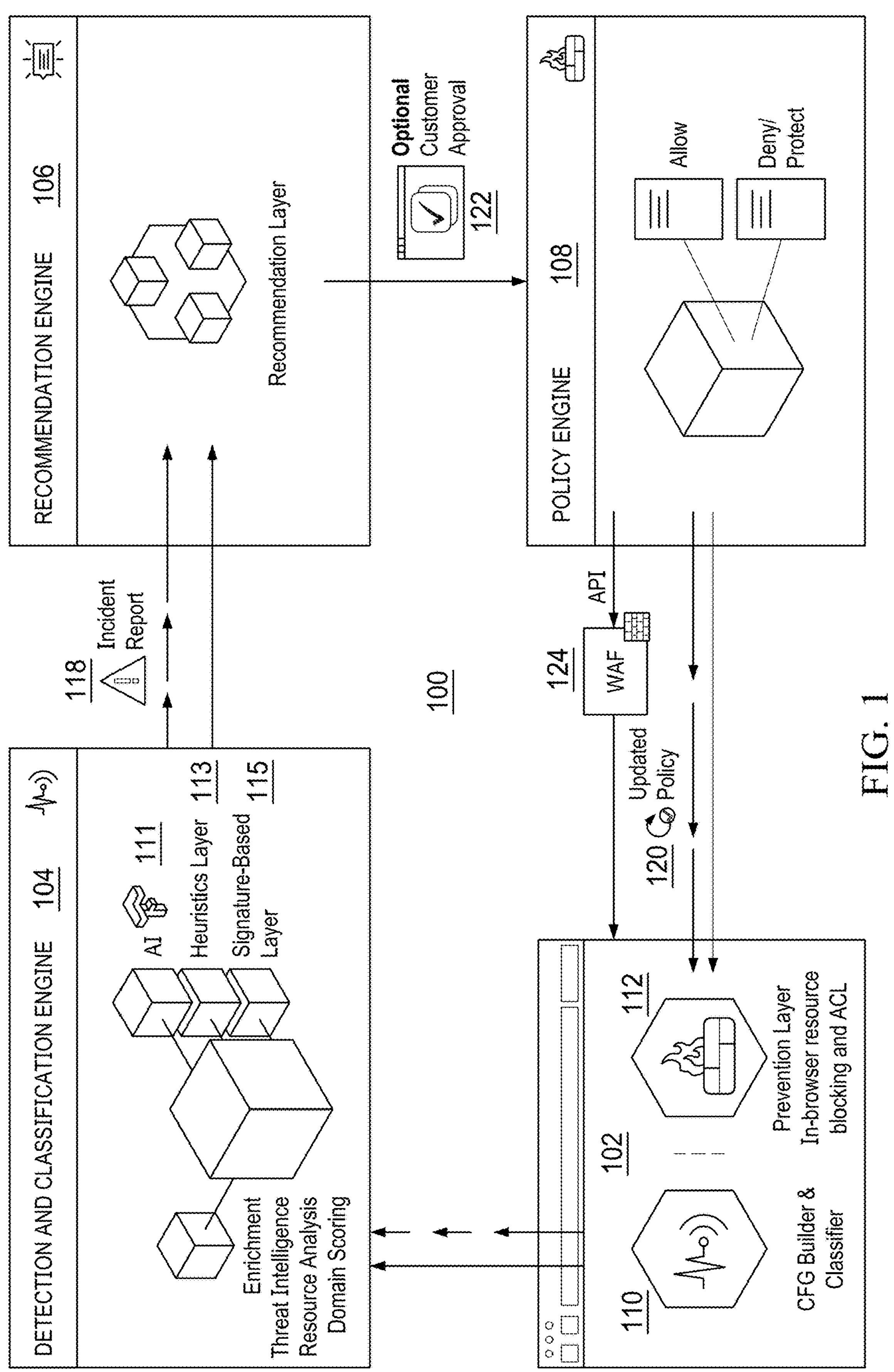
FIG. 1 is a block diagram illustrating a representative system architecture of this disclosure to detect and mitigate a script-based attack.

The techniques herein address and solve this problem. To this end, and as shown in FIG. 1, a Run-time, Web application-based, Self-Protection (RWASP) solution is provided. This nomenclature is not intended to be limiting. Further, the approach herein is not limited for use with any particular browser, with respect to any particular type of page (website or web application), and the techniques may be implemented regardless of whether the functionality herein is hosted by the site. In a preferred implementation, the components depicted in FIG. 1 operate apart from the site itself, whether delivered by the site publisher, or by a third party service provider (e.g., a CDN) on the publisher's behalf. The website or web app whose pages are instrumented (as will be described below) for data collection and CFG generation according to this disclosure may be hosted and/or delivered in/from a cloud infrastructure, a CDN, directly, or some combination thereof. Thus, the particular implementation of the site is not an aspect of this disclosure.

The solution 100 shown in FIG. 1 comprises a client-side component 102, and several cloud-based server-side components, namely detection and classification engine 104, recommendation engine 106, and policy engine 108. One or more of the server-side components may be integrated. As will be described in more detail below, the client-side component 102 is configured to run within a web browser (or comparable client-side functionality), e.g., as a plug-in component. A web browser may be configured to include the client-side component 102 as a native component or execution thread. The client-side component comprises a CFG (Call Flow Graph) builder and classifier 110, and a prevention layer 112. The CFG builder and classifier 110 executes detection and policy logic that are responsible for creating the CFG, which in turn is provided to the server-side detection and classification engine 104 for detection (on the cloud) of activity representing a malicious script. Typically, and as will be described in more detail below, a CFG is created for each page view that occurs in the browser.

As also depicted, the detection and classification engine 104 comprise a detection cloud that comprises the server-side logic that runs the CFG through a series of detection layers, e.g., an AI layer 111, a heuristics layer 113, and a signature-based layer 115. The layers 113 and 115 typically leverage static models, while the AI layer 111 provides for deep learning-based AI. For example, in one embodiment, the AI layer 111 comprises a deep neural network (DNN). The detection cloud determines whether the received CFG (or a set of such CFGs captured for a set of page views) represents a malicious script that should be addressed. If so, the detection cloud issues to the customer (through an UI or API) an incident report 118, which report is then provided to the recommendation engine 106. This engine runs a recommendation layer that, depending on configuration/policy, issues (e.g., to the website customer) a recommendation about how to address the malicious behavior (or take some other mitigation, blocking or notification action). As depicted, the customer may elect to approve the recommendation in advance before it is applied, or it may be applied automatically. In either case, once the malicious script/behavior is identified/determined, the policy engine 108 takes the recommendation and generates a policy update (a change to an existing policy, a new policy, etc.), and this policy update 120 is then output. As depicted in FIG. 1, the policy update is shown as being returned to the client-side prevention layer. In practice, this is accomplished by having the policy generator bundle the policy update 120 with a new instance of the client-side component, with the resulting bundle then pushed to the website or a CDN (that serves the site). In this manner, when the page thereafter gets delivered to other end users, the malicious behavior will not re-occur. Conceptually, this operation is carried out by the prevention layer 112, which provides in-browser resources for mitigating the attack, e.g., blocking, applying an access control list (ACL), or the like. The particular mitigation action is not an aspect of this disclosure.

As also depicted in FIG. 1, before the policy engine updates the policy, the site publisher (the customer) may be provided an option 122 to approve the proposed change. As further shown, the updated policy 120 may also be instantiated in a Web Application Firewall (WAF) 124. Although not depicted, optionally the client-side component may operate its own detector module. This module may comprise functionality (e.g., an obfuscated and light version of the server detection cloud) to make an initial determination of whether a particular CFG needs to be sent to the server-side. In particular, this function determines a probability that a given CFG needs to be scanned and, if not, the client-side component may simply discard it. When implemented, this function manages load on the server so that certain CFGs, e.g., those that merely represent known code execution patterns, need not be evaluated. This enables the server detection cloud to prefer higher risk CFGs over lower risk ones.

Figure 2:
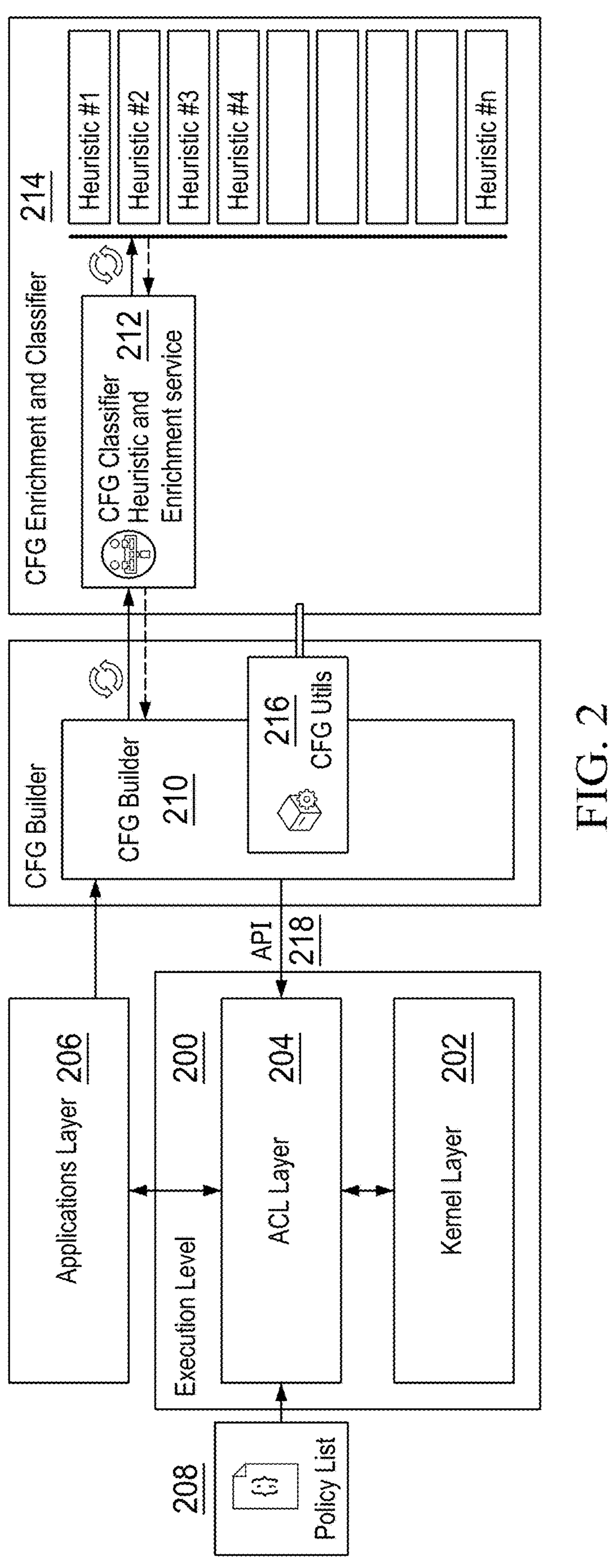
FIG. 2 is a block diagram illustrating an architecture of an in-browser component that implements a detection mechanism for creating a Call Flow Graph (CFG), according to one embodiment.

The client-code resides in the user's web browser, and this code may be delivered to the client in any manner, e.g., by the website, by a CDN, or otherwise. FIG. 2 depicts the client-side component functionality, which as noted above executes the detection and policy logics that are responsible for creating the CFG for detection (on the cloud) and prevention and policy enforcement (on the client). As will be described, this component is responsible for carrying out the appropriate actions required to gain fine-grained visibility with respect to code execution flow in the web page. To this end, the client-side component itself is implemented as a JavaScript and, in particular, the first JavaScript code to execute on the page's resource loading sequence. As used herein, this JavaScript is sometimes referred to as a control (or RWASP) script. As depicted in FIG. 2, the control script has a set of functions. On the left side of the diagram, an execution level 200 comprises a kernel layer 202, and an access control layer (ACL) 204. An applications layer 206 overlaying the execution level 200 represents an abstraction and, in particular, where other scripts in the page interact with the client-side component script. The ACL layer 204 reads a policy list 208 that provides one or more security policies for enforcement at the client, and this policy list 208 may receive and instantiate any policy update (if and when the server-side determines to provide one).

During initialization, the client-side component JavaScript hooks into every JS function in the page, mainly "native" JavaScript functions (e.g., outgoing network access, storage access, Document Object Model (DOM) access, cookie access, and others), as well as other functions that may not be native (e.g., jQuery functions). As depicted, the kernel layer 202 represents the actual native functionality. The applications layer 206 represents these same functions after they are hooked by the control script (and perhaps divided into categories). For example, consider the network application layer; it includes, among others, the function "fetch." The function "fetch" in the kernel layer 202 thus represents the native copy of the function, while in the application layers 206 the function "fetch" is the hooked copy of the native function. This hooked copy includes a CFG logging point, the ACL part (a portion of the ACL layer 204), and a reference (pointer) to the original native function in the kernel layer 202. As the page executes, the client-side component script maintains an in-memory data structure with the pointers to the functions, managing execution of the actual functions (native and others), keeping track of the execution data points and their associated execution chains. In particular, and with reference to FIG. 2, as a hooked function executes, the control script intercepts the activity and logs it (to the CFG builder sub-component as will be described), passing arguments through to the ACL layer 204, which returns a true/false response (whether the activity is permitted or not). The ACL layer 204 consults the policy list 208 to make this determination. In this manner, the client-side component script acts as a proxy that controls the execution environment within the browser. At the same time, the information collected during this processing is passed to the CFG builder 210.

The CFG builder 210 and the associated CFG enrichment and classifier 212 execute during the lifecycle of the page view to create the CFG for the view. The CFG is an array of nodes (objects), with each node (object) representing a code (JavaScript) execution data point. The CFG builder maintains a log of activity captured by the ACL layer 204 interactions with the kernel layer 202 and the applications layer 206, and builds the CFG node-by-node. Asynchronously, the CFG enrichment and classifier 212 provides a heuristic and enrichment service that, for each execution data point, analyzes the data point and "enriches" it according to a set of heuristics 214. Representative heuristics may include, without limitation, payload analysis, reflected data, overlay detection, SSA, SBD (cross navigation), PII cleaner, and others. Data associated with a given heuristic may be identified by setting a flag in the event object.

As also depicted in FIG. 2, the CFG builder 210 includes one or more CFG utilities 216. CFG utilities 216 create and maintain the in-memory map of the flows (synchronous and asynchronous) represented by the code execution chains of execution data points. The CFG utilities collect all the JavaScript method calls, including property setters and getters made by the web page first-and third-party resources, recording the execution trace of executed code during the view. Using a form of a list of code interactions with the browser, the execution trace is represented in the CFG, which as noted above is an exact record of the execution of an application, also representing the caller-called relation from an execution trace, with the caller function and the called function nodes connected by a unique ID reference. As such, the CFG keeps all data on events, allowing the ACL layer 204 to answer (via API 218) who triggered the event, and what they want to do. The CFG utilities 216 also provide a data compression service to create a compressed and serialized binary representation of the CFG. This binary representation is delivered (e.g., to a cloud-based detector) on the server-side for analysis and potential action, as previously described.

Summarizing, the call flow graph enables the representation of the relations between and among run-time JavaScript execution data points. As noted above, a JavaScript execution data point is associated with any command or function executed by the browser JavaScript run-time, together with a dataset of associated execution metadata (e.g., constructor name, accessed property or method, timestamp, caller script (originator), and the like. Typically, each of the CFG nodes includes an execution data point and its associated attributes. Using the CFG classifier, the execution data point is enriched with one or more relevant attributes that describe that specific execution activity represented by the execution data point.

Figure 3:
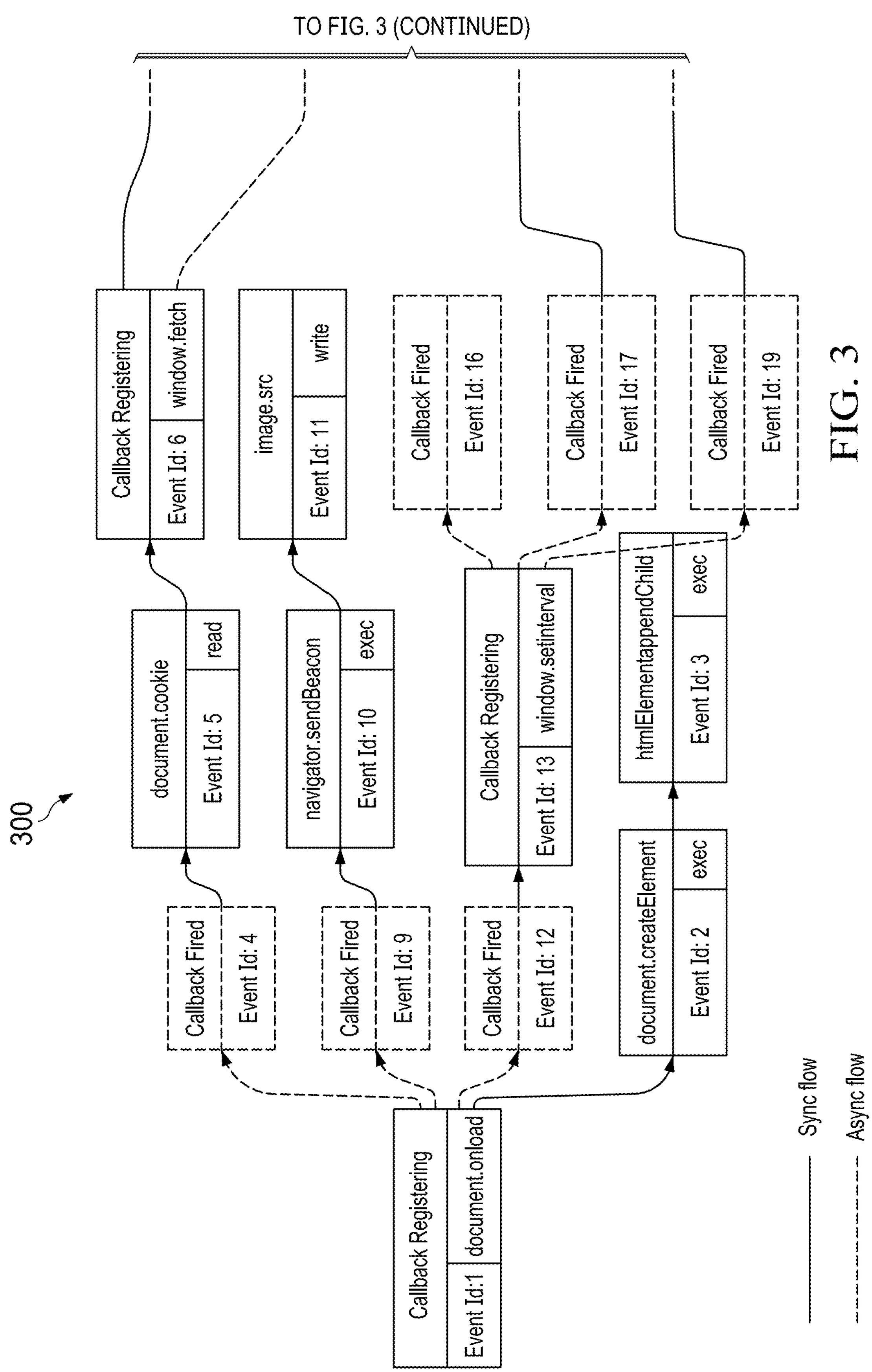
FIG. 3 depicts a representative CFG.
Figure 3:
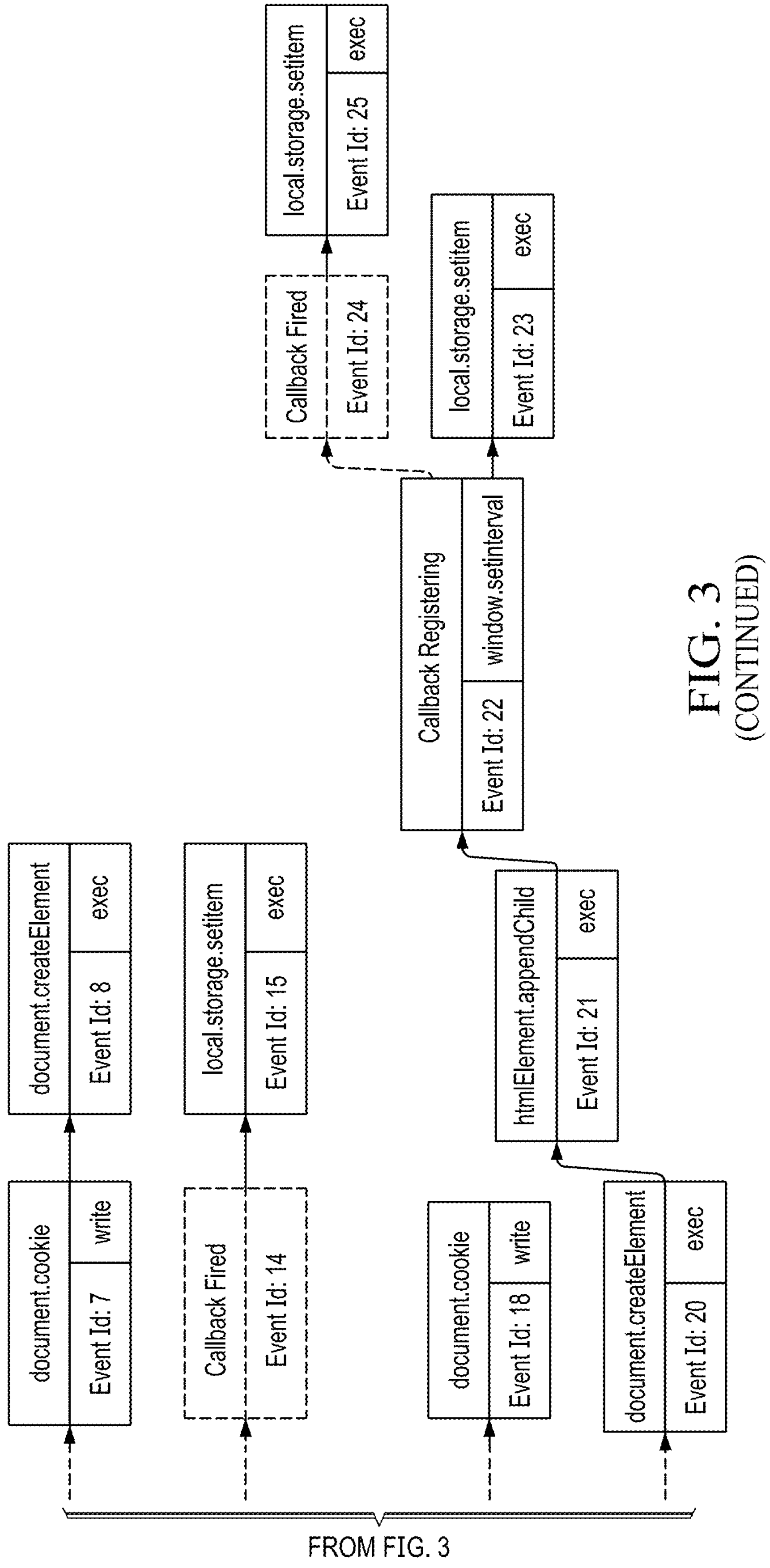

FIG. 3 depicts a representative CFG 300. This CFG, as is typical, includes both synchronous and asynchronous flows. The synchronous flows are depicted by solid lines, and the asynchronous flows are depicted by dotted lines. As depicted, the graph depicts a representation of the relations between events-neighbor nodes, grandparent, parent and sibling nodes. A numeric identifier (ID) representation is provided to each node, representing the position of the node. Typically, each node represents an event (or, more generally, some command execution activity), and a pointer references a location to either node (non-linear and asynchronous JavaScript operations, such as callbacks, promises and async/await). The CFG is constructed by the CFG builder, which preferably makes the following considerations when determining the location within a hierarchy in which to place a particular code-execution representation node: (i) a previous executed event node with the same originating script, and (ii) if this is an asynchronous operation, keep a link back to the originating synchronous code execution source, but create a new code execution node-chain.

As noted above, a CFG (such as depicted in FIG. 3) represents the lifecycle of a page view. The nodes depicted in the CFG (and their relationships) are of course page-specific. Consider a payout web page. The CFG tracks all of the JavaScript resources that have access to the values of the payment form, the manipulation on the data, and finally the exfiltration of the data out of the end user's browser. The script does not collect (or otherwise masks) sensitive data or user-entered values. The CFG builder maps all the code execution chain of events that have to do with the exfiltration to their originating script/URL sorted by execution time, and the specific execution chain. The CFG enrichment and classifier enriches each event (or some of them) with event-specific data (e.g., network events, including the output URL, and an indication that the event is of type Network). Later, and on the server-side, the CFG is then traversed and scanned for different indications of malicious activity, e.g., by leveraging heuristic and anomaly detection models.

Figure 4:
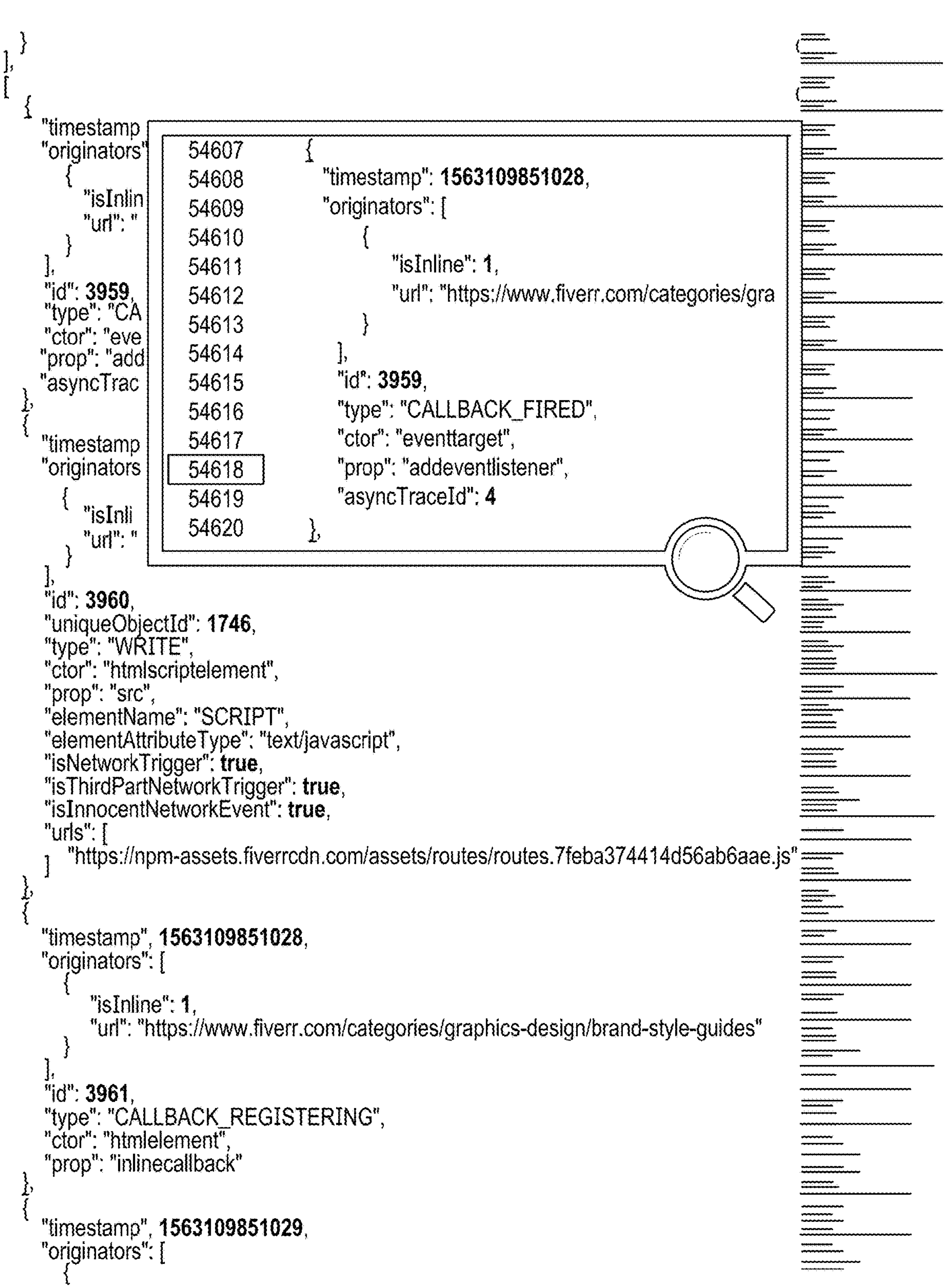
FIG. 4 depicts a compressed and serialized binary representation of a portion of the CFG in FIG. 3 that is provided to the server-side for further analysis.

As noted, a CFG node corresponds to a JavaScript execution data point, and typically each such data point includes some form of the following code execution collected data: (1) (code execution is mapped to the following) Command Type: Execution, Read, Write, Return Value, Dispatch, Timer; (2) Constructor—the native Javascript object constructor on which the command was executed (e.g., HTMLDocument); (3) Property—the native Javascript object property (command) that was called on the constructor (e.g., document.createElement); (4) Element Name (if applicable)—the HTML Element name, if this code execution is related to an HTML Element; (5) Element Attribute (if applicable)—a set of three element attribute maps: id, class and type, mapped to their value on the HTML element (e.g., elementAttributeld, elementAttributeClass, elementAttributeType); (6) Unique DOM Object ID—a unique identification of each DOM Object kept as a numerical ID; (7) Parent Id—which node is the parent of the current execution chain; (8); Async Trace Id—if the chain is of an asynchronous flow, to which detachable execution chain does this node belongs; (9) Sibling Id—the previous execution node in execution chain of events; (10) Script Originator Source—each code-execution node is tagged with the URLscript that executed that code; (11) Outgoing URL (if applicable)—if this is a networking event, the outgoing URL is logged (query parameters masked); (12) Sensitive Data Area Type—keeps track of whether this code execution data point node accessed DOM elements that were predefined as protected elements; and (13) Event Descriptors—these are Boolean values describing the type of the command execution of this node (e.g., Descriptors include: isNetworkEvent, IsInvisibleElement). As the CFG is being built, the CFG utilities maintains the data in-memory. As noted above, the CFG utilities include a service that creates a compressed and serialized binary representation of the CFG that is pseudo human-readable. FIG. 4 depicts a representative portion the compressed and serialized binary representation (in a JSON format) for the CFG in FIG. 3.

On the client-side, preferably the CFG is kept in its in-memory state (with numeric pointer and dictionaries, but without necessarily including the explanation of what each pointer means). When the CFG needs to be sent out to the server, it is compressed and serialized, and then sent as a binary file. The file then arrives in the back-end, where it is decompressed and deserialized back to its in-memory form for subsequent processing as will be described further below.

The above-described methodology provides significant advantages over existing approaches. Each and every user session is unique and different from one another-due to geographic specific content, different browsers, platforms, and installed extensions and software on the end user's computer. Therefore, data needs to be collected and represented in a form (here, the CFG) to allow accurate and context-based analysis of each session. While other solutions try to analyze the site's code before the code is published, or to look for known malicious code or vulnerabilities in the page, the technique herein is premised on understanding the actual behavior of the page in the different execution contexts of each session. By identifying malicious activity traits in the code execution, the proposed method is able to detect both known and previously unseen attacks (zero-days).

Figure 5:
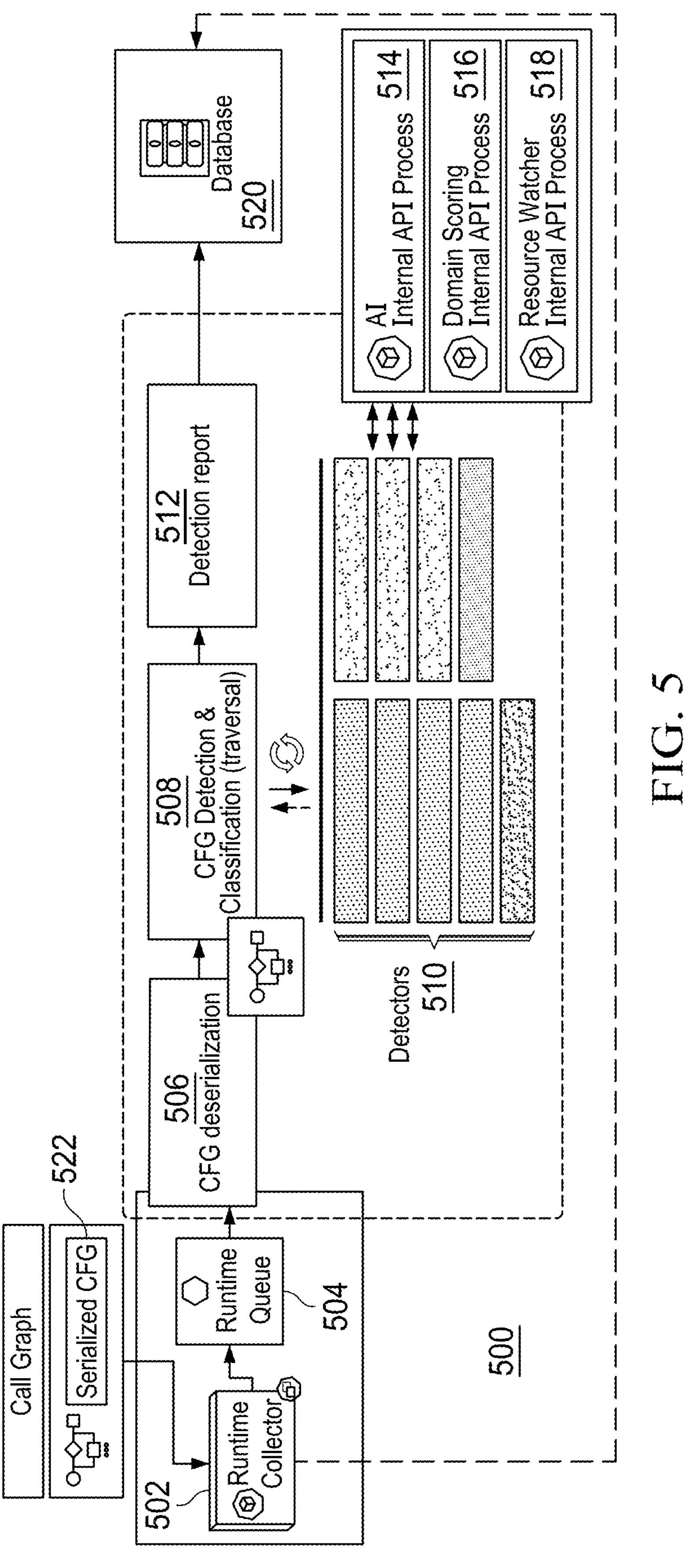
FIG. 5 is a detailed block diagram of a preferred embodiment of a set of detection mechanisms in the server-side back-end infrastructure.

Referring now to FIG. 5, a block diagram depicts the detection and classification engine (FIG. 1) in additional detail. This subsystem comprises an event processor that is responsible for processing CFG binaries received from the end user via RWASP. The event processor performs run-time detection and classification using several APIs and heuristic detectors to determine whether a session was affected by a bad actor. As depicted, the event processor 500 comprises a runtime collector 502, a runtime queue 504, a CFG deserialization component 506, a CFG detection and classification (traversal) component 508, a set of detectors 510, and a detection reporting component 512. The detectors 510 leverage one or more of an AI component 514, a domain scoring component 516, and a resource watcher component 518. The event processor has an associated database 520. In operation, the serialized CFG 522 is received at the runtime collector 502 and placed on the queue 504 for processing. Typically, the collector 502 collects CFGs derived from multiple end user interactions with the page; as mentioned above, these end user interactions typically are quite varied in that they involve geographic-specific content, different browsers, platforms, and installed extensions and software on the end user's computer. The different CFGs (all associated with a given page of interest) are collected and placed on the queue. Each CFG is then de-serialized to recover all the full data set generated by the CFG builder/classifier (on the client-side) and then applied to the one or more detectors 510 for analysis. The nature and scope of the behavioral execution analysis may vary, but typically it includes a series of detection layers that collectively determine whether to issue an incident based on the data from the generated CFGS for the page view. Thus, for example, AI component 514 may comprise frequency-based inferencing that uses a statistical machine learning model that tries to predict the next event in an event chain. An example algorithm is a discrete-time stochastic process such as CRP. This model assesses the likelihood of each event appearing after another based on the previous n events. The AI component 514 may further include a deep learning model that then traverses each logical event chain and frames every n events. Each frame is then given a score based on a system prediction of that frame of events. A representative deep learning model that may be used for this purpose is a convolutional neural network (CNN), such as a variant of a Word2Vec algorithm. The AI processing finds foreign code segments in the code flow execution by learning and predicting the execution order of the code, and by attempting to predict anomalies by following the code execution path and by identifying deviation from context norms. The processing provides a method that assesses the likelihood of each event or chain appearing after another based on the previous n events (produces embedding for chains of n events execution, n-gram).

The domain scoring component 516 provides an internal domain risk analysis (domain reputation score) that relies on one or more data sources and a risk weighting system. The resource watcher component 518 inspects web resources and typically comprises one or more sub-components such as CORS IFrame inspection, a JavaScript vulnerability scanner that checks for known CVEs, and JS Integrity that monitors JS resources for changes (checksum). It is not required that all of these layers be utilized, and additional detection mechanisms may be incorporated.

Based on the above-identified analysis by the event processor, an incident report may be raised and then provided to the recommendation engine (FIG. 2). The recommendation engine monitors (awaits) incidents that are found by the event processor and releases them (e.g., to the customer). Incidents may be released to the customer immediately, periodically, or otherwise, e.g., based on their volume and incident type. If the nature of the incident is such that changes to the site are necessary, and depending on configuration, the policy engine may then implement appropriate or necessary policy changes. Generalizing, a policy is a set of policy application, access-control rules that determine the access an originator or vendor has within a web application. A policy is instantiated in the policy list (FIG. 2). Policy application is an access-control unit that determines the access an originator or vendor has to the web application; applications typically include outgoing network access, cookie access, DOM access, storage access, and sensitive data access. Each enabled policy application controls the vendor's access inside the web application, in the scope of that specific application. A whitelist (allow mode) (e.g., "allow all of the specified, and nothing else") provides that only the specified rules are granted access, while all others are denied access, depending on the selected application. A blacklist (deny mode) (e.g., "deny all the specified, but allow everything else) provides that only the specified rules are denied access, while all others are granted access, depending on the selected application. If the event processor's CFG analysis raises an incident that the recommendation engine determines should result in a policy change, the policy engine generates the policy update and instantiates it in the client-side prevention layer, all as described above.

The policy engine provides for prevention and enforcement of site policy, and the above-described system provides a dynamic policy solution for website permission management, policy enforcement and mitigation of active attacks, by intercepting unauthorized events in real-time on the execution level according to the specification of the web application configured policy.

The detection cloud, recommendation engine and policy engine may be combined with one another. Generalizing, each such functionality (service) may be implemented using a set of computing resources that are co-located or themselves distributed. Typically, a service is implemented in one or more computing systems. The computing platform (or portions thereof) such as described may be implemented in a dedicated environment, in an on-premises manner, as a cloud-based architecture, or some hybrid. A typical implementation of the infrastructure is in a cloud-computing environment. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform of this disclosure may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

The functionality may be provided in whole or in part as a service, e.g., as a Saas solution, in association with a CDN, or otherwise.

Each above-described service, process, module or sub-module preferably is implemented in computer software as a set of program instructions executable in one or more processors, as a special-purpose machine.

Representative machines on which the subject matter herein is provided may be Intel or other core processors running a Linux operating system. In one embodiment, the back end architecture leverages Docker and Kubernetes technologies, and a micro-process architecture. The micro-process granularity enables the back end to scale only where computer power is required at a given time (e.g. for running AI-based detection). Micro-processes and services are containerized (Docker) and run in a clustered manner (Kubernetes) to facilitate autoscaling as needed.

Any functionality described may be implemented as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

One preferred implementation of the CFG detection cloud is executed on a cloud provider (e.g., Azure) on a managed Kubernetes service, and that operates in association with a content delivery network (CDN) or, more generally, an "overlay network" that is operated and managed by a CDN service provider. Components of the infrastructure as described herein may execute in the CDN. Generalizing, a distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

When implemented in association with a CDN that delivers the site, a CDN edge server may be controlled to inject a JavaScript tag to the page.

The traceable data structure herein may take on forms other than a hierarchical graph (a tree) of event nodes. Other data structures in which the data may be represented include a data array, a linked list, and the like.

What is claimed follows below.

The invention claimed is:

1. An apparatus, comprising:

at least one hardware processor;

computer memory holding computer program instructions executed by the hardware processor configured to detect script-based attacks, the program code configured to:

receive at least first and second traceable data structures generated from respective first and second clients, each traceable data structure comprising a set of runtime JavaScript execution data points and associated event chains that include the execution data points and their relative ordering, the traceable data structure having been generated in association with a context-specific interaction with a view of a page in a user session;

perform a behavioral execution analysis on the first and second traceable data structures to identify an actual behavior of the page, wherein the behavioral execution analysis uses a machine learning model that identifies foreign code segments in a code execution flow to assess a likelihood of each event or event chain appearing after another based on a previous set of events;

based on the actual behavior of the page, identify a script-based attack;

responsive to identifying the script-based attack, update one of: the page, and a policy associated with the page.

2. The apparatus as described in claim 1, wherein the machine learning model is a convolutional neural network (CNN).

3. The apparatus as described in claim 1, wherein the program code is further configured to instantiate the policy.

4. The apparatus as described in claim 1, wherein the behavioral execution analysis is also based on a domain reputation score.

5. The apparatus as described in claim 1, wherein the context-specific interaction associated with the view of the page by the first and second clients differ from one another in at least one of: a geographic-specific content associated with the page, different browsers, different platforms, and different installed extensions and software on a respective user machine.

6. The apparatus as described in claim 1, wherein the program code executes as a network-accessible service.

7. The apparatus as described in claim 1, wherein the traceable data structure is a call flow graph (CFG) that comprises a set of nodes, wherein a given node is associated with a particular script execution data point.

8. The apparatus as described in claim 1, wherein the traceable data structure is received as a compressed and serialized binary representation in which code execution-collected data is encoded.

9. A computer program product comprising a computer-readable storage medium, the computer program product holding computer program instructions executable in one or more hardware processors, the computer program instructions comprising program code configured to:

receive at least first and second data structures generated from respective first and second clients, each data structure comprising a set of runtime JavaScript execution data points and associated event chains that include the execution data points and their relative ordering, the structure having been generated in association with a context-specific interaction with a view of a page in a user session;

perform a behavioral execution analysis on the first and second data structures to identify an actual behavior of the page, wherein the behavioral execution analysis uses a machine learning model that identifies foreign code segments in a code execution flow to assess a likelihood of each event or event chain appearing after another based on a previous set of events;

based on the actual behavior of the page, identify a script-based attack; and responsive to identifying the script-based attack, update one of: the page, and a policy associated with the page.

10. The computer program product as described in claim 9, wherein the data structure comprises event data configured as one of: a hierarchical graph of event nodes, a data array, and a linked list.

11. The computer program product as described in claim 9, wherein the machine learning model is a convolutional neural network (CNN).

12. The computer program product as described in claim 9, wherein the program code is further configured to instantiate the policy.

13. The computer program product as described in claim 9, wherein the behavioral execution analysis is also based on a domain reputation score.

14. The computer program product as described in claim 9, wherein the context-specific interaction associated with the view of the page by the first and second clients differ from one another in at least one of: a geographic-specific content associated with the page, different browsers, different platforms, and different installed extensions and software on a respective user machine.

15. The computer program product as described in claim 9, wherein at least one of the first and second data structures is a call flow graph (CFG) that comprises a set of nodes, wherein a given node is associated with a particular script execution data point.

16. The computer program product as described in claim 9, wherein at least one of the first and second data structures is received as a compressed and serialized binary representation in which code execution-collected data is encoded.

* * * * *